United States Patent [19]

McGaffigan

[11] Patent Number: 5,526,561
[45] Date of Patent: Jun. 18, 1996

[54] METHOD OF MAKING AN INDUCTION HEATING TOOL

[75] Inventor: Thomas H. McGaffigan, Half Moon Bay, Calif.

[73] Assignee: Gas Research Institute, Chicago, Ill.

[21] Appl. No.: 407,324

[22] Filed: Mar. 20, 1995

Related U.S. Application Data

[62] Division of Ser. No. 868,872, Apr. 16, 1992, Pat. No. 5,412,184.
[51] Int. Cl.$^6$ ............................................. H01F 41/06
[52] U.S. Cl. ............................ 29/605; 29/607; 219/643
[58] Field of Search ............................... 29/605, 606, 607, 29/609; 219/607, 643, 635, 637, 659

[56] References Cited

U.S. PATENT DOCUMENTS

| | | |
|---|---|---|
| 3,238,346 | 3/1966 | Savko . |
| 3,665,138 | 5/1972 | Edge et al. . |
| 4,388,510 | 6/1983 | Hughes . |
| 4,398,345 | 8/1983 | French et al. ................... 29/605 X |
| 4,547,962 | 10/1985 | de Walle et al. ................. 29/606 |
| 4,695,335 | 9/1987 | Lyall . |
| 4,695,712 | 9/1987 | Busch . |
| 4,714,513 | 12/1987 | McAlister . |
| 5,107,095 | 4/1992 | Derbyshire . |

FOREIGN PATENT DOCUMENTS

| | | |
|---|---|---|
| 750400 | 5/1933 | France . |
| 1480978 | 4/1967 | France . |
| 86847 | 3/1990 | Japan . |
| 8002124 | 10/1980 | WIPO . |

OTHER PUBLICATIONS

"Resistance of Heating Coil", pp. 1–57.

Primary Examiner—Carl E. Hall
Attorney, Agent, or Firm—Speckman, Pauley & Fejer

[57] ABSTRACT

A jaw-like cylindrical tool for producing a strong electromagnetic field for causing a Curie point heater to be energized having a curved cross-section that brings the two edges of the jaw-like structure into contact. Closely spaced conductors lie along the inner surface of the structure transverse to its axis while widely spaced conductors lie transverse to said axis along the outer surface of the structure. The inner surface of the structure has a plurality of axially extending ferrite rods lying immediately adjacent the inner surface conductors. The inner and outer surface conductors are connected so that the currents flow in opposite directions, the outer conductors reducing electromagnetic radiation while the ferrites and inner conductor spacing produce a strong central magnetic field irrespective of the field created by the opposing field produced by the outer conductors. The tool may be manufactured by laying each ferrite rod longitudinally along the flat surface of a D-shaped mandrel with the rods lying side by side transversely. Conductors are wrapped transversely around the curved surface of the mandrel and over the ferrite rods. The rods and conductors are bonded to one another, removed from the mandrel and the resulting structure curved until the longitudinal edges of the structure are in contact with one another.

9 Claims, 4 Drawing Sheets

METHOD OF MAKING AN INDUCTION HEATING TOOL

This is a divisional of copending application Ser. No. 07/868,872 filed on Apr. 16, 1992," now U.S. Pat. No. 5,412,184.

TECHNICAL FIELD

The present invention relates to a wrap-around induction heating tool and method of making and more specifically to a solenoid type, flexible induction heating tool that may be disposed about loads of varying sizes or diameters either by front entry or side access.

BACKGROUND OF THE INVENTION

The prior art devices to perform the same function as the present invention were large, bulky, copper induction coils with mating electrical contacts that are subject to arcing and sparking.

Also provided were clamshell type induction coils that were large and bulky or solenoid type induction coils that provided no side access to the load, only access from a free end.

OBJECTS OF THE INVENTION

It is an object of the invention to provide a high efficiency, solenoid type, unidirectional magnetic field induction coil tool.

It is a primary object of the present invention to provide a solenoid type induction coil structure to generate a unitary coaxial electromagnetic field whereby a unitary heater or series of heaters, preferably a birdcage type heater or heaters, may be uniformly heated to fuse a connection sleeve having plastic pipes inserted into the two ends of the sleeve.

It is another object of the present invention to provide an induction coil tool that can be used over a wide range of high frequencies.

It is yet another object of the present invention to provide a solenoid type induction coil tool that may wrap around or provide side entry to loads of varying sizes and types.

Still another object of the present invention is to provide a solenoid type induction coil having inner and outer windings arranged to improve the electrical efficiency of the device by the use of ferrites adjacent the inner solenoid winding whereby to increase the strength of the field of the inner winding relative to the outer winding.

BRIEF DESCRIPTION OF THE PRESENT INVENTION

The present invention provides a jaw-like solenoid type induction coil device in a generally cylindrical or similar shape. The jaw-like member may be a single member that is flexible to permit the opposed edges to be separated or have hinged members and may be opened to fit around or slide over a load and then closed to grasp the load. Both forms are referred to herein as jaws. The jaws have continuous solenoid type windings along inner and outer surfaces of the jaw-like members and in the preferred embodiment has ferrite members located adjacent the inner solenoid winding to greatly enhance the field produced by the inner solenoid relative to the outer solenoid whereby to produce a strong field in the area encompassed by the inner solenoid windings. The outer solenoid is employed to produce a return current path and to reduce magnetic field radiation by producing a field external to the outer windings in opposition to the inner solenoid field. The outer winding has widely spaced turns so that closely spaced turns of the inner winding produce a stronger field even in the absence of the ferrites. When ferrites are added to the inner windings, they not only increase the flux density of the field but also cause the field to be concentrated in the region interiorly of the inner winding and render the field more uniform. Because of this feature and the axial nature of the flux, the tool does not have to entirely surround the load (heater) in order to produce uniform heating of the load, due to the currents induced in the load being circular, that is, the current flows perpendicular to the axis of the sleeve around the heater and this path is completed in conductive loads.

In a still further embodiment of the invention the outer turns are spaced radially outward from the inner turns by a distance equal to at least ¼ ID of the device. Maximum performance is achieved by (1) the use of the high mu material adjacent the inner winding, (2) wide axial spacing of the outer windings, and (3) the radial spacing of the outer windings from the inner windings. Any one of the three arrangements alone will achieve a degree of the desired performance but as indicated above maximum performance is achieved when all three are employed, with only half such performance achieved by the individual arrangements.

One of a number of different known mechanisms may be employed to spread the jaws and two embodiments are disclosed.

The tool of the present invention is designed primarily for use in the plastic fusion field although it has a number of uses such as heating in general; heating lossy ferrites, which can be disposed in heat shrink tubing as disclosed in McGaffigan U.S. patent application Ser. No. 07/465,933 filed Jan. 16, 1990, or the heating of terminals as disclosed in McGaffigan et al U.S. Pat. No. 5,098,319 issued Mar. 24, 1992. It is related in purpose to an application of Frank Doljack entitled "Link Coupling", both to be assigned to the same assignee and filed on concurrent dated herewith. The tool of both inventions may be used with Curie point self regulating heaters as described in various patents such as U.S. Pat. Nos. 4,256,945 and 4,695,712 as well as co-pending U.S. application of Ross et al, Ser. No. 07/657,996, filed Feb. 20, 1991, and initially assigned to the same assignee as the present invention.

The heater that the tool of the invention is designed to be used with is a wire that may be ferromagnetic or a copper or other highly conductive wire coated with a ferromagnetic material. Unlike the heater of the Ross et al application, the solenoid type flux distribution permits a single continuous heater structure to be employed rather than requiring two distinct axially aligned heaters each excited by a different half of the induction coil structure. In addition the heater may be of a non-conductive nature such as that which can be composed of lossy ferrimagnetic or ferromagnetic particles dispersed in a non-conductive material as disclosed in U.S. patent application Ser. No. 07/465,933.

The power supply to energize the tool is preferably a constant current source so that power delivered to the heater is controlled by the equation $P=KR$ where $K=I^2$. When the ferromagnetic or ferrimagnetic material is heated to its effective Curie temperature there is a material drop in the coupled resistance and heating is reduced sufficiently that the temperature drops below effective Curie temperature and the heater cycles about its effective Curie temperatures.

The above and other features, objects and advantages of the present invention, together with the best means contemplated by the inventor thereof for carrying out his invention will become more apparent from reading the following description of a preferred embodiment and perusing the associated drawings in which:

DETAILED DESCRIPTION OF THE PRESENT INVENTION

Figure 1:
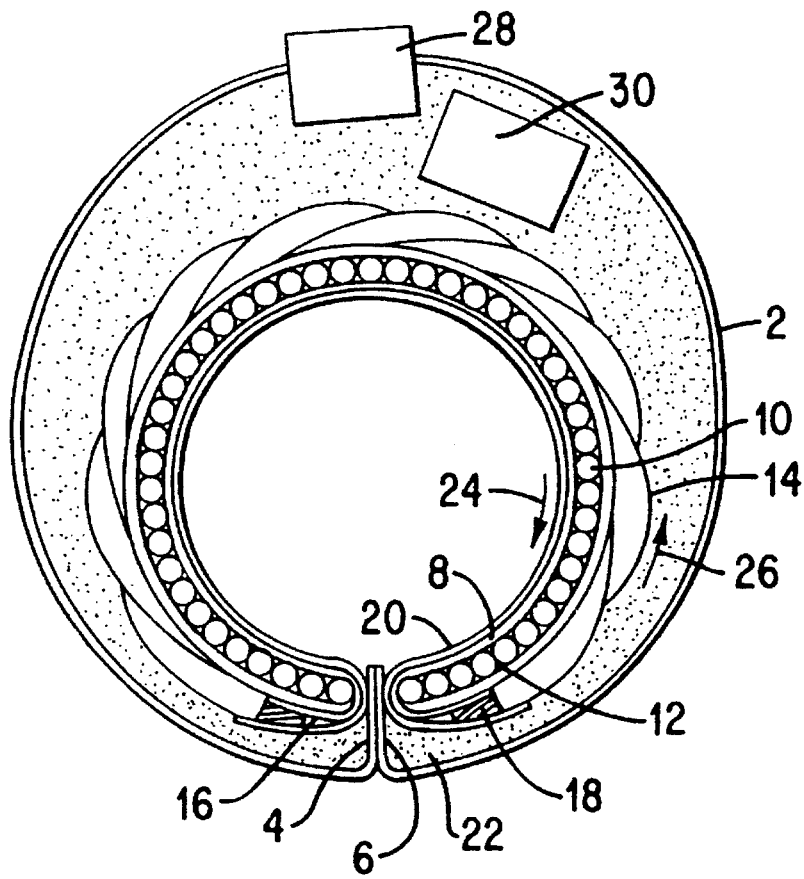
FIG. 1 is an end view of a basic structure of the present invention.

Referring now specifically to FIG. 1 of the accompanying drawings, a preferred embodiment of the structure 1 has a flexible generally cylindrical outer shell 2 preferably of a polycarbonate or polyurethane material. The shell 2 has adjacent its two ends inwardly directed parallel members 4 and 6 such that when the jaws are closed the ends of the shell are in contact with one another.

The inner solenoid coil structure is confined within the outer shell 2 and comprises insulated flexible copper bands 8 forming a cylindrical inner coil with a plurality of axially extending ferrite, relatively small diameter rods 10 (roughly 3/16 inch diameter) disposed adjacent to the outer surface of the bands 8. Although the use of low loss ferrimagnetic ferrites are preferred, other high mu ferromagnetic or ferrimagnetic materials may be used. Also a continuous ferrite member may be employed with equal results. Insulating material, preferably in the form of a sheet 12 of silicone rubber foam is disposed about the cylindrical array of ferrite to retain the ferrite and distance it from the outer solenoid winding.

The outer solenoid winding comprises a plurality of pairs of insulated wires 14 which may be twisted (only one of said pair of wires being illustrated in FIG. 1). These pairs of wires encircle the foam layer 12 and are arrayed along the axial dimension of the cylindrical array. These wires provide a return current path for the inner solenoid bands 8.

Figure 3:
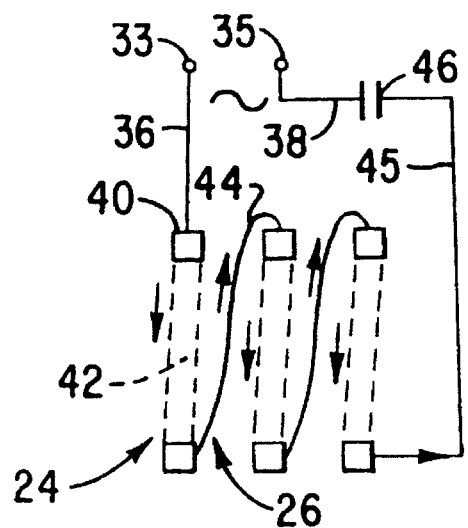
FIG. 3 is a wiring diagram of the coil structure of FIG. 2.

The insulation is removed from the ends of the wires 14 and the exposed ends of the wire are soldered at 16 and 18 to the ends of adjacent copper bands 8 which wrap around the ends of the jaws and are composed, for example, of elements 8, 10 and 12. The actual interconnection arrangement of wires and bands is illustrated in FIG. 3. To complete the basic structure of the invention an insulating fabric 20 preferably a silicone fabric, Chorlastic 1025, covers the inner surface of the bands 8 and is brought out between the members 4 and 6 to cover the junction of the wires 14 and the bands 8. Kapton is used to insulate the bands 8 from one another.

To further describe the preferred embodiment of the invention, the bands 8 preferably comprise a plurality of discrete bands arrayed very close to one another. The wires 14 are preferably Litz wire of a construction dictated by the operating frequency of the system. At high frequencies solid or tubular wires may also be used without sacrificing performance. The space between the shell 2 and the Litz wire is filled with an insulating flexible foam, preferably silicone foam, or polyurethane foam.

The current flows in the wires as indicated by arrows 24 and 26 in FIG. 3. The tight spacing of the bands 8 and the use of the ferrite rods cause the field produced by the inner solenoid bands in the interior of the jaws to be much stronger than that produced by the widely spaced turns of the outer solenoid wires 14. The field produced by the turns 14 do, however, reduce electromagnetic radiation from the tool, if properly positioned relative to the inner turns. The shell has mounted thereon a connector 28 to which current, preferably constant current, is supplied. A capacitor 46 is retained within the foam 22 between the outer shell 2 and the outer solenoid wire 14. Electrical connections 33 and 35 are illustrated in FIG. 3.

Figure 2:
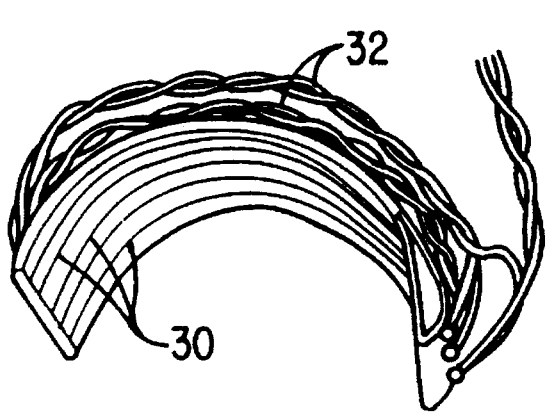
FIG. 2 is a view in perspective of the coil structure of the present invention.

Referring now to FIG. 2 of the accompanying drawings, the bands 8 of FIG. 1 are shown as a plurality of copper bands 30 adjacent to one another being connected in series by wires 32. The device of FIG. 2 is shown without any high permeability material such as ferrites adjacent to the bands 30. The bands 30 of the tool are very closely spaced with essentially no gap therebetween while the wires 32 are not only widely spaced but are spaced from the inner windings by ¼ ID of the inner windings, further enhancing the strength of the inner solenoid field as opposed to that produced by the outer solenoid windings. This effect can be further enhanced if wires 32 are not in line with each other as seen in FIG. 4 which also employs the ferrites.

Referring to FIG. 3 of the accompanying drawings there is illustrated a wiring diagram for the tool. Leads 36 and 38 are connected to a constant current source, of 50 KHz to 500 KHz for example. The ferrite employed in the 50–350 MHz range is #77 of the Fair Rite Corporation. The tool can be used in the megahertz range but a different ferrite should be used at these higher frequencies. The lead 36 is connected to one end 40 of a first band 42. The other end of the band 42 is connected to an outer solenoid wire 44 and so on through the coil structure to a return lead 45 that is connected through a resonating capacitor 46 to lead 38. The resonating capacitor is employed to lower the power factor of the solenoid coil circuit.

Figure 4:
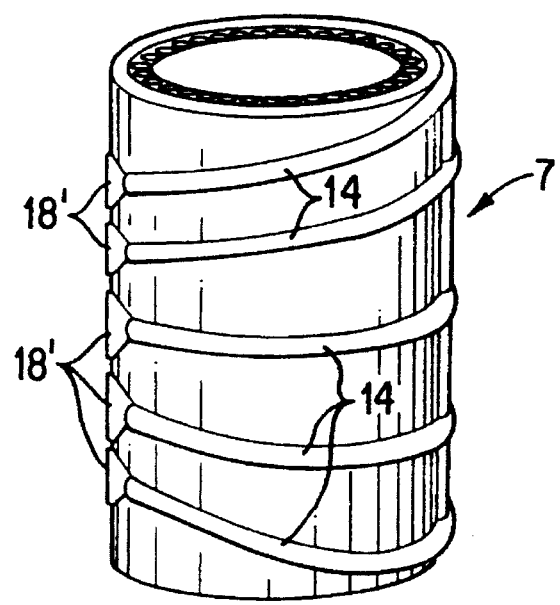
FIG. 4 is a perspective view in elevation of the apparatus of FIG. 1.

Referring now specifically to FIG. 4 of the accompanying drawings, a tool according to FIG. 1 is illustrated in perspective. The tool or structure has five wires 14 connected at junctions 18' to the inner bands of the tool. The uppermost and lowermost junctions 18' define the upper and lower limits of the inner bands while the wires 14 are spread out to further reduce the magnitude of the field of the outer turns relative to the inner turns. Spacers 9 maintain the spacing between the wires 14. It should also be noted that the ferrite rods extend beyond the ends of the inner windings to increase the linearity of the field. By maximizing the spacing of wires 14 their magnetic field is localized and minimized.

Figure 5A:
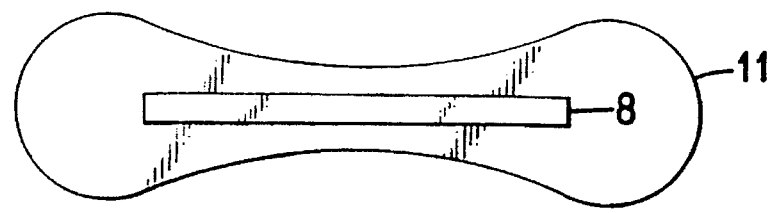
FIGS. 5a and 5b illustrate the current distribution in the inner solenoid conductive bands without and with the ferrite rods, respectively.
Figure 5B:

Referring to FIGS. 5a and 5b of the accompanying drawings, FIG. 5a illustrates the distribution of the current in the inner bands 11 in the absence of the ferrites. FIG. 5b illustrates the current 11' distribution in the presence of the ferrite rods 10 adjacent one side of a band 8. Thus the use of the ferrites or the like ferromagnetic material substantially redistributes the current peak from the edges of the bands. In addition it should be noted that an apparatus with a great disparity of turns between the exterior and interior of the jaws produces an interiorly disposed axial field but such field will be weak and not as well directed as that produced with the use of the ferrites or like rods.

Referring to FIGS. 2 and 4 of the accompanying drawings, the distribution of the bands 30 and wires 32 and 14 and the spacing factors and fields resulting therefrom are discussed. The magnitudes of the flux interiorly and exteriorly of the coil are a function of the space factor of the coils. The equation for space factor is:

$$Sf = \frac{WN}{L}$$

where W is the width of an uninsulated turn of the coil, N is the number of turns and L is the total length of the coil.

The outer and inner turns, x and y, respectively, are 1 for 1 in number while the spacing is obviously quite different. If the inner turns y are 6 in number, each turn is 0.650 wide and the length of the coil is 4 inches, the Sf for the inner coil is 0.975. If oil the other hand, the outer coils are ¼" wide, then Sf on the outer coil is 0.3125. If the arrangement of FIG. 4 is employed for the outer coil, L=5½" and Sf is 0.227. It is quite apparent that the currents of the coils y of FIG. 6 assist each other in developing the axial flux interiorly of the jaws while the current flow in the coils x produce flux independently of one another.

Figure 6:
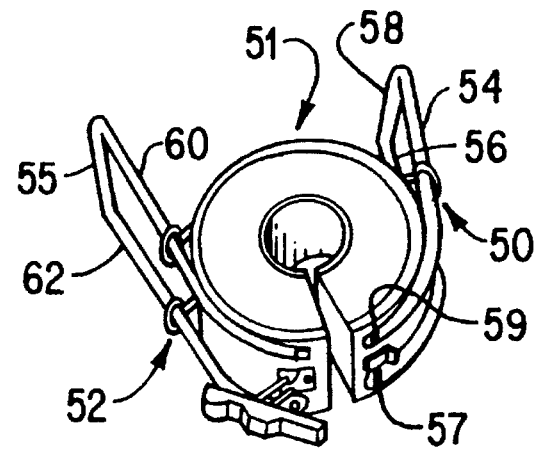
FIG. 6 illustrates in perspective view the fully assembled tool of FIG. 7.

In FIG. 4, the difference is even more marked and in addition, the outermost outer coils are more effective in preventing electromagnetic radiation from the inner coils from extending beyond coils x than in FIG. 6.

Referring now to FIG. 6 of the accompanying drawings, there is illustrated a compliant tool 51 with one means for opening the tool for application to a load. The tool 51 is provided with two handle arrangements 50 and 52. The handle 50 has two arms 54 and 56 attached at points 57, 59 along the circumference of the tool and a cross member 58. The handle arrangement 52 has two arms 60 and 62 also attached at axially spaced points along the circumference of the tool and a handle or cross member 55. The members 54, 56, 60 and 62 are attached at points 53, 55, 57, 59 near the opening between the ends of outer shell 66 so that the handles 50 and 52 may be squeezed together, using the shell of the device to provide the pivot points, to open the jaws.

Figure 7:
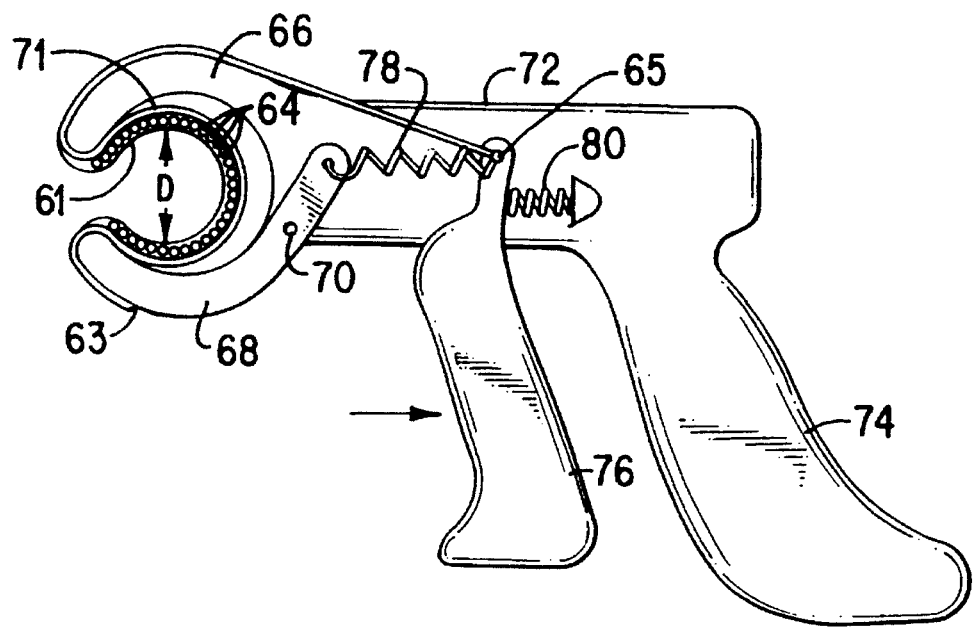
FIG. 7 is a side view of the tensioning tool prior to tensioning the inner solenoid windings.
Figure 8:
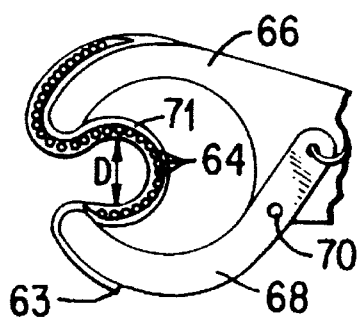
FIG. 8 is a side view of the jaws of FIG. 7 after tensioning the inner solenoid windings.

FIG. 8 discloses another arrangement for opening jaws of the tool of a second embodiment of the invention. In this embodiment, tool 64 comprises rigid jaws 66 and 68 pivoted to one another at point 70. The jaw 66 is integral with and located at the end of a forward extension 72 of a pistol grip 74. A draw bar handle 76 is slidably received in the forward extension 72 and is attached to the jaw 68 above the pivot 70, as illustrated in FIG. 7, through an extension spring 78. A compression spring 80 is attached to the draw bar handle 76 and as viewed in FIG. 7 exerts a force on the draw bar handle tending to push it to the left. When it is desired to close the jaws the draw bar handle is squeezed, spring 78 pulls on the upper end of the jaw 68, the jaw is rotated about pivot 70 and the jaws are closed, simultaneously inner winding band 61 is tensioned around the load 69.

The jaws 66 and 68 of FIG. 8 enclose a flexible metal band 61 that extends from an attachment point 63 of jaw 68, extends over the end of jaw 68, interiorly of the jaws in a loop and over the end of jaw 66 and along its body to draw bar handle 76 where it is attached at point 65. An array 67 of ferrite or ferromagnetic rods 69 are secured to but electrically insulated from the band 61.

Referring now to FIGS. 7 and 8 of the accompanying drawings, when the draw bar handle 76 is pulled, the band 61 along the outer surface of jaw 66 is pulled to the right as viewed in FIGS. 7 and 8 so that the band 61 can be cinched around a load conforming to its shape during heating. This ability of band 61 is very desirable thus enabling the tool to accommodate large variations in size or diameter. This feature is especially important if the load changes diameter or size during heating as would be the case with inductively heated shrink tubing. It is noted that the band 61 with the ferrite rods is flexible enough to fold back around the nose of the upper jaw 66.

Figure 9:
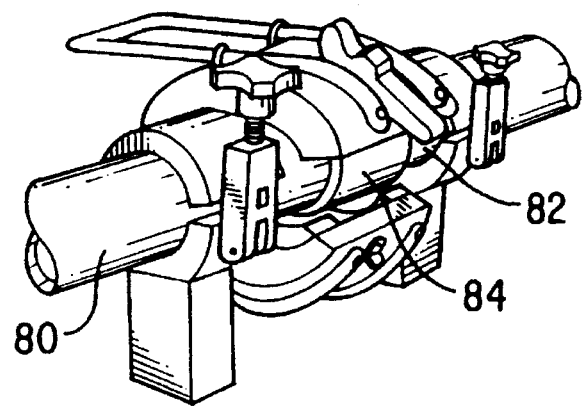
FIG. 9 illustrates the tool of FIG. 6 when the tool is partially clamped about a load.

Referring now to FIG. 9 of the accompanying drawings, there is illustrated the tool of the present invention partially closed around a load to be heated.

Two plastic pipes 80 and 82 are to be joined by a plastic sleeve 84. The pipes 80 and 82 are inserted into opposite ends of the sleeve 84 and are to be fused to the sleeve. The sleeve 84 contains a Curie point heater which may be one of the type disclosed in the aforesaid Ross et al application, the disclosure of which relating to heater structures is incorporated herein by reference.

The tool of the present invention is illustrated as partially enclosing the sleeve 84 and when fully enclosing the sleeve, the heater is energized by application of current to the tool. The alternating magnetic field magnetically links the heater raising it to a temperature above the fusion temperature but below the destruction temperature of the plastic. As previously indicated, the tool does not have to completely encircle a load to be fully effective. Using the right hand rule it is apparent that the currents flowing in the heater, flow around its circumference. As long as a material part of the heater is linked by the alternating magnetic flux the heater is energized.

One method of manufacture of a coil structure according to the present invention is illustrated in FIGS. 10-13 and employs a coil fabrication method and structure different from that illustrated in FIGS. 1 and 2. In an alternate form, both inner and outer conductors are continuous and are made of braided wire, in general the type of braid used as the outer shielding conductor of a coax cable. The conductor is flattened (see FIG. 15 for greater detail on this point) to provide the desired close spacing on the inner surface of the structure and is maintained round on the outer surface to provide less dense spacing. The spacing between the inner conductors can be further decreased to virtually that of the insulation by compressing the braid longitudinally to expand its width. Also if the wires of each pick are Litz wires, the wires of each pick and all of picks carry the same current. Thus the inner conductors can be made as dense as desired with equal currents throughout the braids reducing the electrical losses in the tool.

Another type of construction utilizing flat multiconductor cable, like that available from Raychem Corporation of Menlo Park, Calif. under Part No. TU-10-200-18B is especially useful since it is preinsulated with a high temperature insulation covering flat conductors with a space factor 0.8. Specifically, this type of cable is known as a ribbon cable but differs from the more typical ribbon cable by the use of the flat conductors. This wise can be used without modification for the inner windings and when split at the individual insulated conductors can be used for the outer windings as well.

The ribbon cable may be used as a continuous member for both inner and outer windings by rolling the cable of the outer windings to form a tight tube. In another configuration assuming 10 conductors across the cable, the cable can be split at one end to provide a group of five conductors so that upon winding about the jaws there are five conductors for each winding. The five conductors of each turn on the outer surface may be separated from one another to provide wide spacing of the outer conductors.

Figure 10:
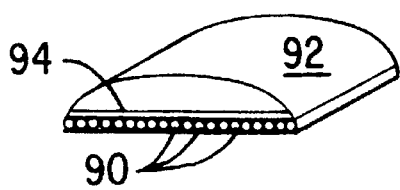
FIGS. 10–13 illustrate the steps involved in assembling an embodiment of the invention illustrated in FIG. 1.
Figure 11:
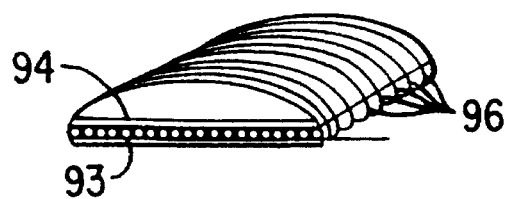

Referring now to FIG. 10, a plurality of ferrite rods 90 are arrayed along the bottom of a D-shaped mandrel 92. The rods are glued to silicone rubber form sheet 94. Referring now to FIG. 11, braid 96 is wound about the mandrel 92 and rods 90 with the braid adjacent the ferrite rods flattened and secured to an insulating tape 93 on the bottom of the rods 90 by RTV silicone adhesive. The turns 96 of the braid on the upper surface of the mandrel as viewed in FIG. 11 are maintained round thus providing a poor space factor. The coil is wound as a simple helix. Braid along ferrite rods 90 is maintained flat to provide a good space factor. The rods and braided structure is removed from the mandrel resulting in the configuration of the structure illustrated in FIG. 12.

Figure 13:
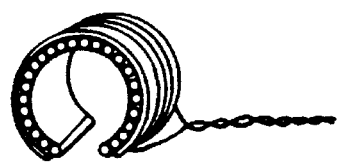

Referring to FIG. 13, the structure incorporating basically the rods 90 and braided wire is bent to form the shape of the tool illustrated therein; that is, the final shape. It should be noted at this point that the radius of curvature of the curved surface of the mandrel is such that when the structure assumes the shape of FIG. 10 the braid 96 lies against the upper surface of the tape on top of the ferrite rods, all as viewed in FIG. 13.

The structure of FIGS. 10–13 greatly simplifies manufacture of the coil structure in two regards; first, no soldering is required as at 40, 45, etc. of FIG. 4 and the individual bands of copper 42 do not have to be laid down and attached to one another.

Figure 12:
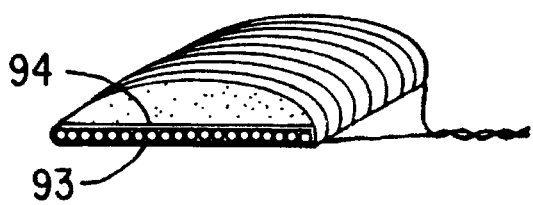
Figure 14:
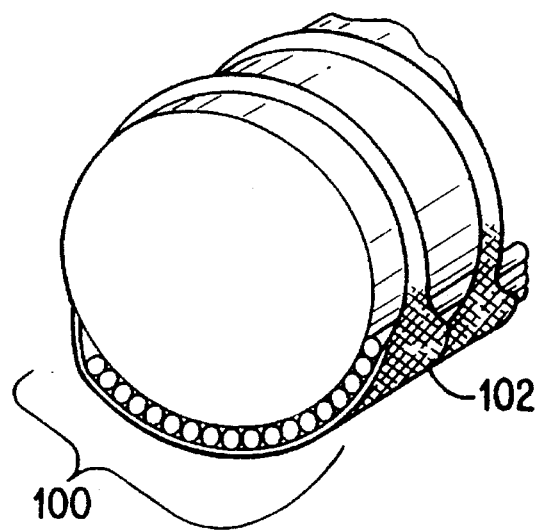
FIG. 14 illustrates another method of fabricating the structure of FIG. 1.

Referring to FIG. 14, the structure is illustrated as being fabricated by winding on a cylindrical mandrel. The structure is the same as illustrated in FIG. 12 except that initially the structure is cylindrical rather than D-shaped. However, since the entire structure is flexible after winding and bonding the structure is removed from the mandrel and the region to form the interior of the jaws, region 100, is pushed radially inward to provide the same configuration as noted in FIG. 13.

The flattened braids extend over the region 100 while the round braids extend over the remainder of the region, location 102 being the transition region.

The structure is described throughout as cylindrical but such shape is not essential. Depending upon the configuration of the loads for which the tool is designed it may be ovate, conical, elliptical or in extreme cases, even rectangular.

Many variations and modifications of the above-described embodiments are within the ordinary skill of the skilled artisan in this art, without departing from the scope of the invention. Accordingly those modifications and embodiments are intended to fall with the scope of the invention as defined by the following claims.

What is claimed is:

1. The method of manufacturing a cylindrical jaw-like structure having windings on the inner and outer surface of the jaw-like structure and a ferrite rod assembly having a plurality of rods adjacent the winding on the inner surface of the jaw-like structure, said method comprising arraying the ferrite rod assembly along a mandrel having a region having a curved surface, with each rod extending longitudinally along a surface of the mandrel and the rods lying side-by-side transverse to the longitudinal axis of the mandrel, wrapping a current carrying conductor around the mandrel and ferrite rods, securing the conductor to the ferrite rod assembly to form a structure, and removing the rods and conductors from the mandrel and curving the structure so that its transverse edges abut.

2. The method according to claim 1 further comprising spacing the windings on the curved outer surface of the mandrel at a distance greater than those along the ferrite rod assembly.

3. The method according to claim 2 wherein said windings are circular conductive braid, the method further comprising flattening the braid adjacent the ferrite rod assembly, and maintaining the circular cross section of the braid across the curved part of the mandrel.

4. The method according to claim 3 wherein said mandrel is D-shaped in cross section and the ferromagnetic rods extend along the flat surface of the mandrel.

5. The method according to claim 4 further comprising selecting a radius of curvature of the curved part of the mandrel such that the conductors on the outer surface of the jaw-like member when curved lie generally in contact with the outer surface thereof.

6. The method according to claim 2 wherein said mandrel is generally circular in cross section.

7. The method according to claim 3 wherein said windings are multiconductor flat cable.

8. The method according to claim 7 wherein said inner windings are flat ribbon cable and outer windings are flat ribbon cable rolled into a relatively tight spiral.

9. The method according to claim 7 wherein said inner and outer windings are a continuous length of flat ribbon cable with the conductors of the outer winding separate from one another to provide wide spacing between conductors.

* * * * *